(12) United States Patent
Higinbotham et al.

(10) Patent No.: US 7,061,905 B2
(45) Date of Patent: Jun. 13, 2006

(54) METHOD AND APPARATUS FOR COMMUNICATING SIGNALS

(75) Inventors: William G. Higinbotham, Lake Hiawatha, NJ (US); Paul Palamara, Denville, NJ (US); Robert Walker, West Milford, NJ (US); Xin Luo, Wayne, NJ (US)

(73) Assignee: RFL Electronics Inc., Boonton, NJ (US)

( * ) Notice: Subject to any disclaimer, the term of this patent is extended or adjusted under 35 U.S.C. 154(b) by 954 days.

(21) Appl. No.: 10/057,799

(22) Filed: Oct. 26, 2001

(65) Prior Publication Data

US 2003/0081634 A1   May 1, 2003

(51) Int. Cl.
*H04L 12/66* (2006.01)
(52) U.S. Cl. ............... 370/352; 370/357; 370/389
(58) Field of Classification Search ........... 370/352, 370/357, 389, 485, 503, 487, 516, 422, 423, 370/442, 441, 480, 486, 489, 490, 498, 401, 370/251, 471–474, 247, 321, 333, 294, 347, 370/470, 476, 466; 375/259, 354, 371, 229, 375/222, 230, 233, 234, 235, 240, 240.01, 375/240.03, 240.04, 240.05, 200, 224, 225, 375/227, 219, 220, 325, 326, 327, 375, 376, 375/340; 348/388.1
See application file for complete search history.

(56) References Cited

U.S. PATENT DOCUMENTS

| | | | | |
|---|---|---|---|---|
| 5,661,778 A | * | 8/1997 | Hall et al. | 379/29.01 |
| 5,745,837 A | * | 4/1998 | Fuhrmann | 725/114 |
| 5,793,759 A | * | 8/1998 | Rakib et al. | 370/342 |
| 5,845,043 A | * | 12/1998 | Yanagihara | 386/109 |
| 5,966,376 A | * | 10/1999 | Rakib et al. | 370/342 |
| 5,991,308 A | * | 11/1999 | Fuhrmann et al. | 370/395.53 |
| 6,154,456 A | * | 11/2000 | Rakib et al. | 370/342 |
| 6,307,868 B1 | * | 10/2001 | Rakib et al. | 370/485 |
| 6,356,555 B1 | * | 3/2002 | Rakib et al. | 370/441 |
| 6,665,308 B1 | * | 12/2003 | Rakib et al. | 370/441 |
| 2001/0001616 A1 | * | 5/2001 | Rakib et al. | 375/259 |
| 2001/0024474 A1 | * | 9/2001 | Rakib et al. | 375/259 |
| 2001/0046266 A1 | * | 11/2001 | Rakib et al. | 375/259 |
| 2002/0015423 A1 | * | 2/2002 | Rakib et al. | 370/485 |
| 2003/0156603 A1 | * | 8/2003 | Rakib et al. | 370/485 |

* cited by examiner

*Primary Examiner*—Wellington Chin
*Assistant Examiner*—Jamal A. Fox
(74) *Attorney, Agent, or Firm*—Martin Novack

(57) ABSTRACT

For use in conjunction with a system for producing, at a transmitter location, time division multiplexed (TDM) frames having a plurality of channels of information signals and framing signals, communicating the frames from the transmitter location to a receiver location, and, at the receiver location, deframing the received frames to obtain frame timing signals and a bitstream of information signals which are coupled with a plurality of operating units. A technique for responding very quickly, upon loss of the TDM signal, to prevent misoperation of the operating units, including: at the transmitter, inserting a preselected pattern of bits in a timeslot of the information signals; at the receiver, detecting, in the deframed bit stream, the absence of the preselected pattern of bits, and producing a control signal in response; and producing override information signals that are coupled to the operating units when the control signal is present.

20 Claims, 7 Drawing Sheets

METHOD AND APPARATUS FOR COMMUNICATING SIGNALS

FIELD OF THE INVENTION

This invention relates to communication of signals in a time division multiplexed (TDM) system and, more particularly, to a method and apparatus that improves operation of a TDM system, such as by preventing an output at a receiver thereof from containing undesired noise patterns for periods long enough to cause a misoperation of a receiver output. The invention has application, for example, to teleprotection systems.

BACKGROUND OF THE INVENTION

Audio Tone Teleprotection is a method of communicating binary states from one substation to another over audio telecommunications links. These binary states are used, for example, to control power line circuit breakers and generators. This practice has existed for over 30 years and has principally been applied over entirely analog systems such as Frequency Division Multiplexers, Analog Microwave, and Direct Analog Fiber.

When a signal occurs in any of the above media, noise occurs at the input of the teleprotection and circuitry inside the teleprotection is designed to prevent a "misoperation". A misoperation is a false state on one of the binary outputs. The result of a false output can be disastrous, e.g. blackouts, fires, and/or equipment damage. It is important to prevent these misoperations in the event of loss of signal, since systems like digital microwave are frequently susceptible to loss of signal, usually due to adverse weather conditions.

With the recent proliferation of telecommunications has come the practice of applying audio teleprotection over Time Division Multiplexed (TDM) digital communications networks. Under failure conditions, different noise patterns occur at the input of the teleprotection. These noise patterns can very closely mimic valid signals indicating incorrect states, possibly causing misoperation of the teleprotection equipment.

The most common form of TDM used in teleprotection is known as T1 or DS-1. T1 is a format defined by the Bell system for digital transmission of analog signals. It is designed to carry 24 audio channels over a 1.544 Mb/s serial digital link, as illustrated in FIG. 1. As shown in FIG. 2, one frame has 24 8-bit words (192 bits) plus 1 framing bit, so one out of every 193 bits is used to create a framing pattern. T1 frames are transmitted at the rate of 8000 per second, so, with 193 bits per frame, the bit rate is 1.544 megabits per second. This framing pattern repeats every 1.5 or 3.0 ms, depending on whether Superframe or Extended Superframe is employed. Superframe is a 1.5 ms frame consisting of 12 consecutive T1 frames. Since standard framing practice is to look for at least 2 bad framing patterns before declaring a loss of frame, the process can take at least 3 ms. Extended Superframe is made up of 24 frames and can take 6 milliseconds or more to detect a loss of frame.

With standard telephone grade multiplexers, a noisy signal is output from the voice channels for up to 2 seconds after a complete loss of signal.

It is among the objects of the present invention to provide a method and apparatus which overcomes disadvantages of existing approaches such as those described, and to prevent misoperations of teleprotection systems in the event of TDM signal loss. It is among the further objects of the invention to achieve this in a way that is compatible with existing teleprotection design, due to the large installed base of teleprotection equipment.

Further features and advantages of the invention will become more readily apparent from the following detailed description when taken in conjunction with the accompanying drawings.

DETAILED DESCRIPTION

Figure 1:
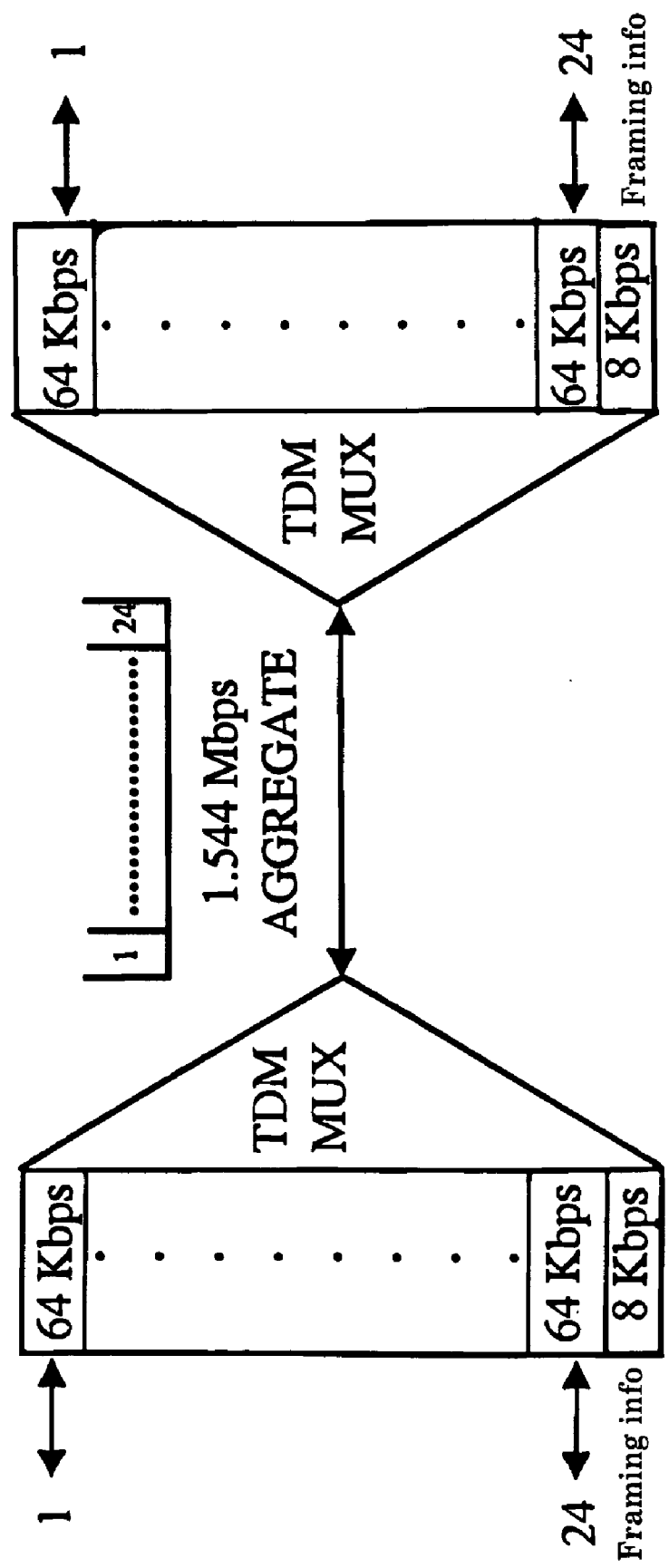
FIG. 1 is a diagram illustrating the T1 (or DS-1) time division multiplexed (TDM) format commonly used for digital transmission of signals.
Figure 2:
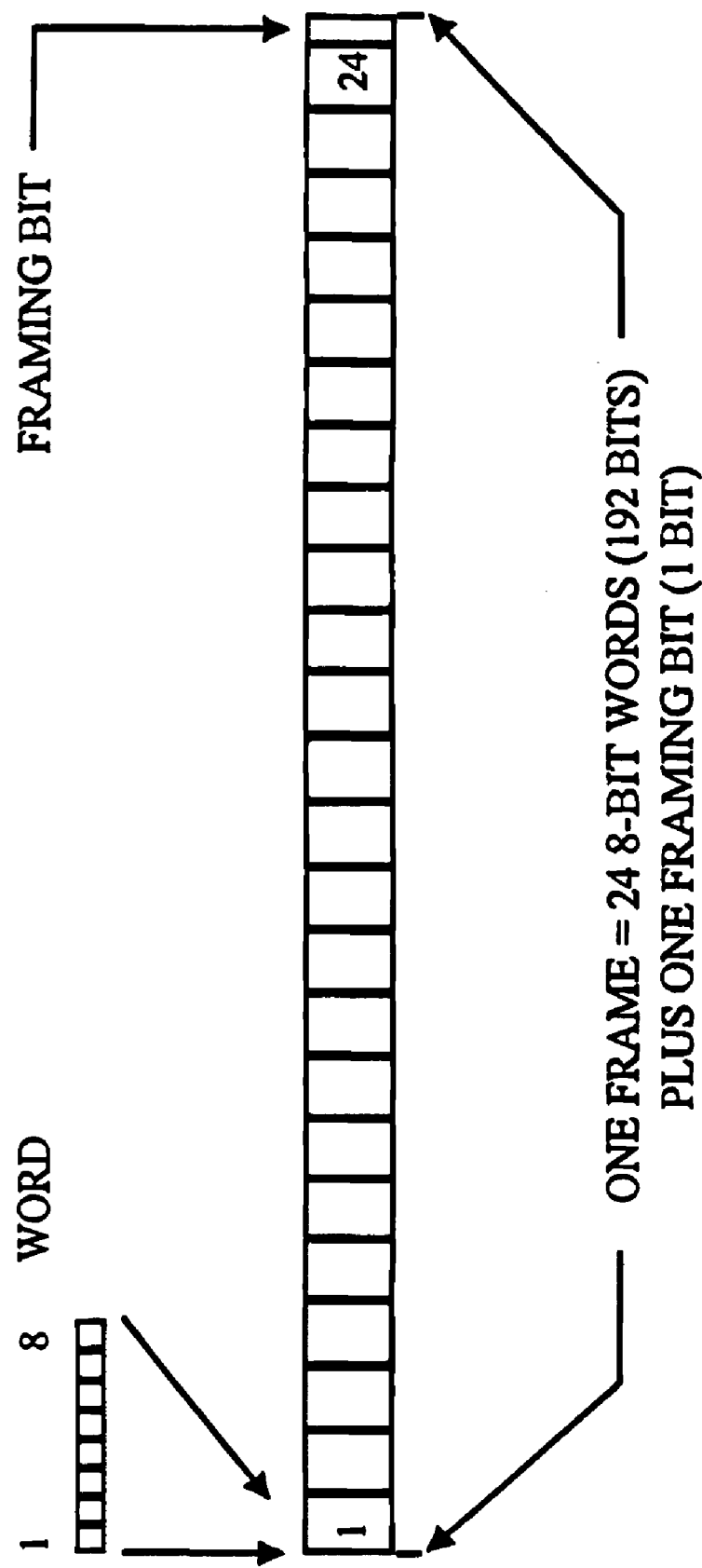
FIG. 2 is a further diagram illustrating a frame of T1 format.
Figure 3:
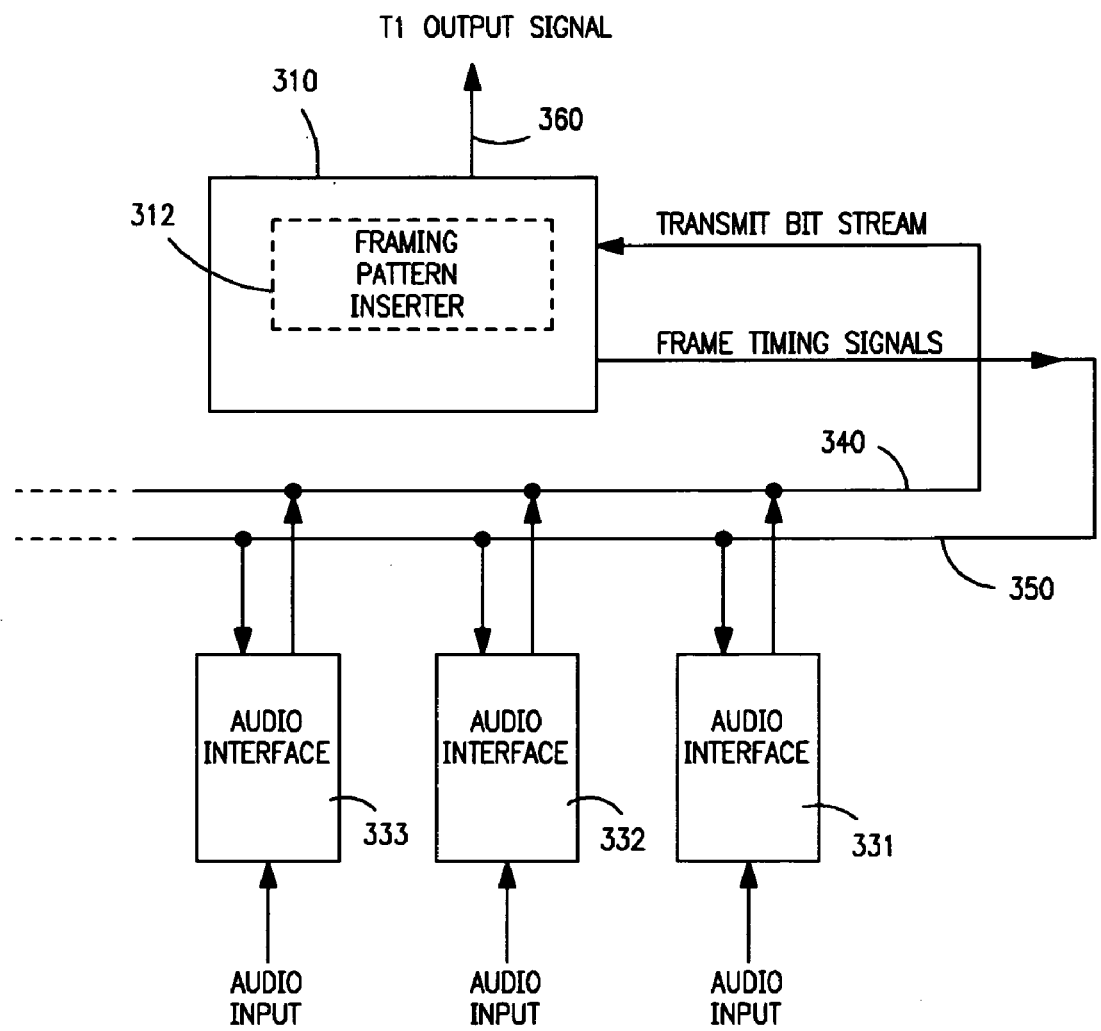
FIG. 3 is a block diagram of a transmitter in accordance with an embodiment of the invention, and which can be used in practicing the method of the invention.

Referring to FIG. 3, there is shown a block diagram of the transmitter portion of an embodiment of the invention. The block 310 represents a T1 framer circuit, adapted, in a manner to be described, to produce a special framing pattern (dashed block 312). In the example of FIG. 3, a number of inputs, which can for example be teleprotection signals at audio frequencies, are input, via interfaces 331, 332, 333 . . . , and the transmit bit stream lines 340, to the T1 framer circuit 310. Each of the interfaces 331, 332, 333 receives frame timing signals from the framer circuit 312, and this provides timing for the bit stream input to the framer circuit. The framer circuit 312 inserts the framing signals, and produces the time division multiplexed (TDM) output signal (T1 output signal on line 360).

Figure 4:
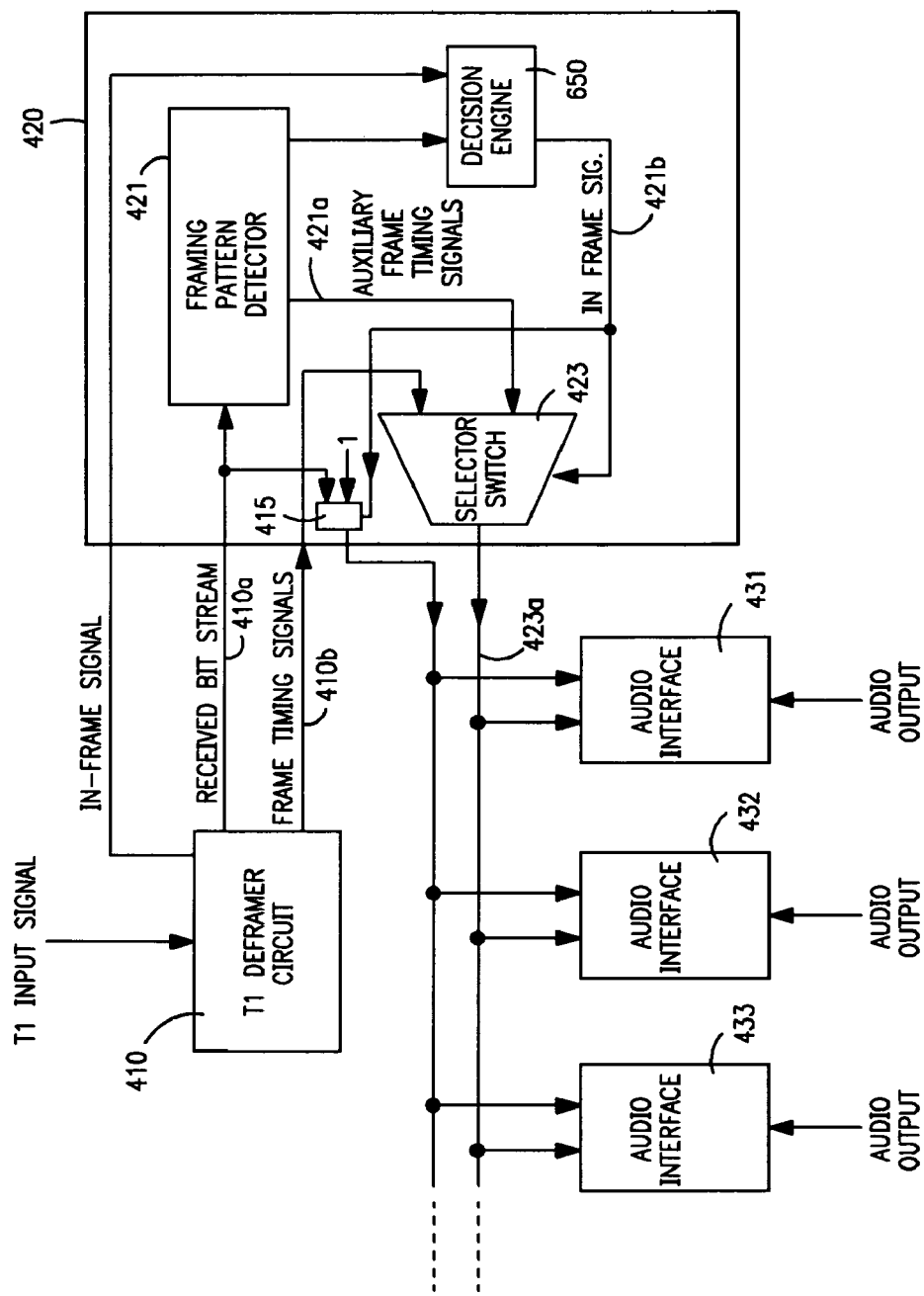
FIG. 4 is a block diagram of a receiver in accordance with an embodiment of the invention, and which can be used in practicing the method of the invention.

FIG. 4 shows a block diagram of the receiver portion of an embodiment of the invention. The T1 input signal is received by a T1 deframer circuit 410, which operates on the T1 signal, in known fashion, to separate the received bit stream and the frame timing signals. These signals are coupled to a block 420, which contains a framing pattern detector 421, a decision engine 650, and selector switches 415 and 423. The received bit stream, on lines 410a, is coupled to the framing pattern decoder 421 and also to one input of selector switch 415, the output of which is coupled to a plurality of audio outputs via audio interfaces 431, 432, 433, . . . . The other input to selector switch 415 is a signal representative of a stream of logical ones. The frame timing signals on lines 410b are coupled to one input of the selector switch 423. The other input to selector switch 423 is frame timing signals output from framing pattern detector 421 on line 421a. The control input to selector switches 415 and 423 is the output of decision engine 650 on line 421b. The decision engine 650 receives the in-frame signal output of the T1 deframer circuit, and a second signal from framing pattern detector, this signal being present when the framing pattern detector detects that the received bit stream is "in frame". The outputs of the selector switches 415 and 423, respectively, on lines 415*a* and line 423*a*, are also coupled to respective data inputs and frame timing inputs of the audio interfaces 431, 432, 433 . . . .

Figure 5:
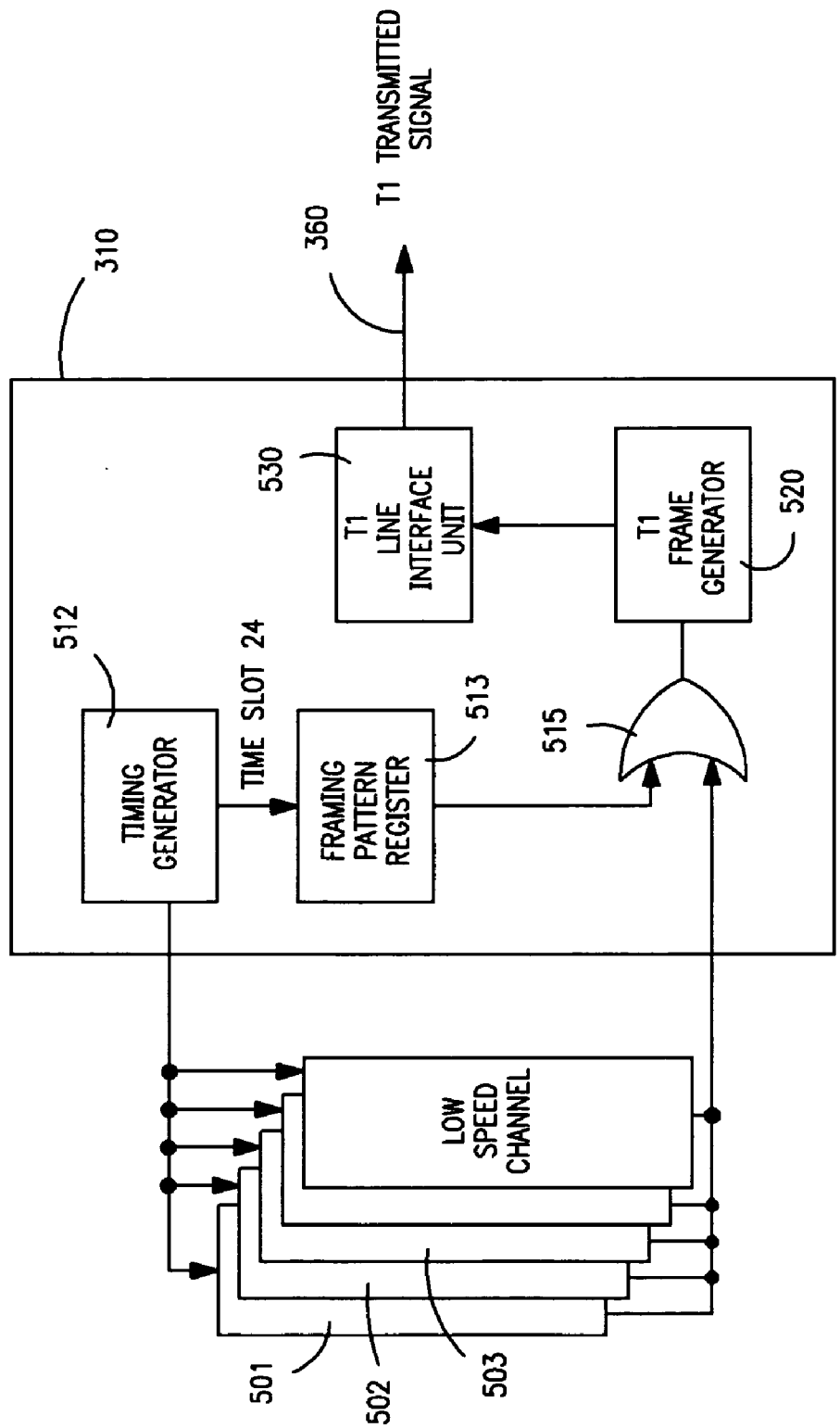
FIG. 5 is a functional block diagram of an embodiment of the transmitter.

Referring to FIG. 5, there is shown a functional block diagram of the transmitter first shown in FIG. 3. In this representation, the transmitter includes a series of low speed modules, which output data into a common backplane in response to timing signals generated by the timing generator 512 that is part of the T1 framer circuit (block 310 of FIG. 3) which typically can be implemented as an integrated circuit. Those modules put out data in their assigned time slots (1–23) and the framer circuit receives the backplane data and inserts it into the T1 frame via gate 515. The special framing pattern is stored in the register 513 inside the framer chip. In the present embodiment, the framer is programmed to insert that pattern in the last timeslot of the T1 frame (24). The bit stream and the associated framing pattern are received by the frame generator 520, and the output T1 transmitted signal is output, on line 360, via the T1 line interface unit 530.

Figure 6:
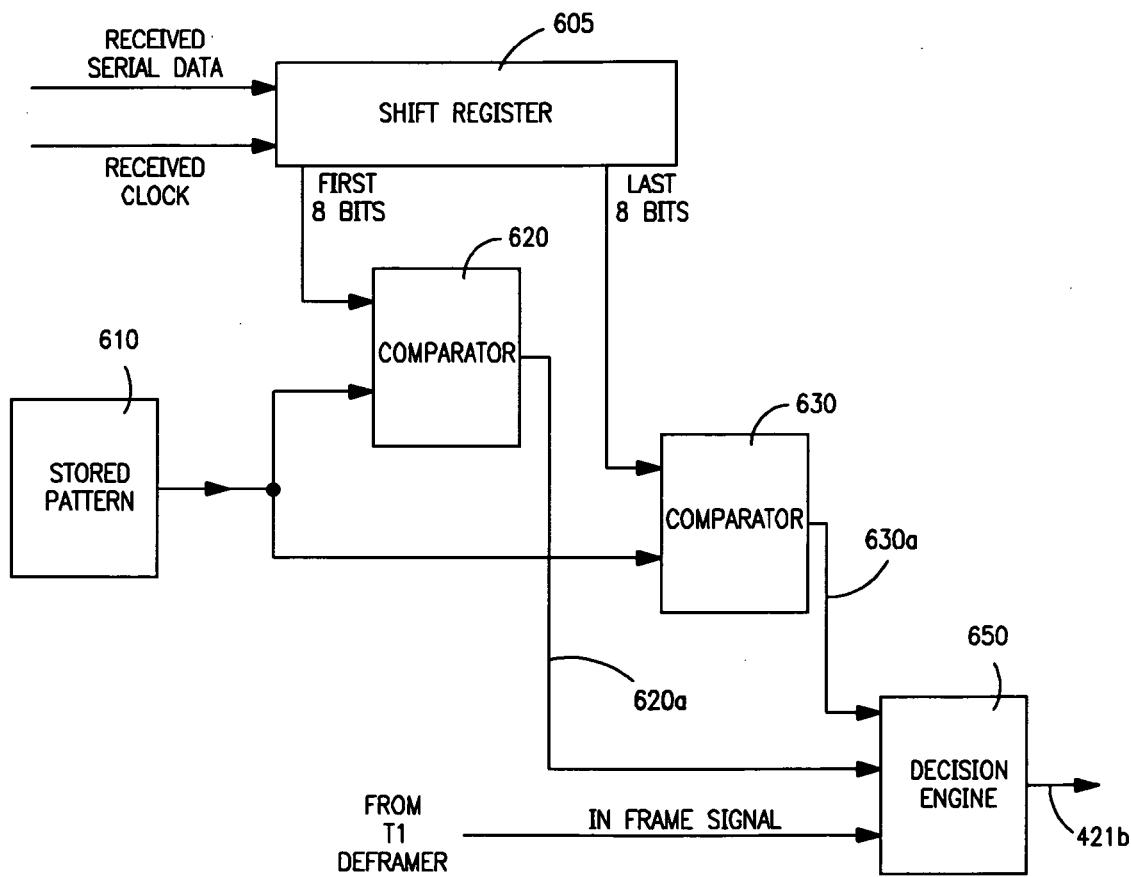
FIG. 6 is a further diagram of the receiver operation.

Referring to FIG. 6, there is shown a representation of the receiver circuit 420 (of FIG. 4), which, in this embodiment, is implemented using programmable logic. The incoming T1 serial data is shifted into a register 605 that is one frame plus 8 bits (201 bits) long. The selected fast reframe pattern (01010011 in this example) is stored in memory 610. Comparators 620 and 630 operate to compare the first 8 bits and the last 8 bits of register 605 to the stored pattern. When the first and last 8 bits of this register both match the stored framing pattern, a match is declared. This condition is input (on lines 620*a* and 630*a*) to a decision engine 650, which also receives the in frame signal from T1 deframer and which can declare an out of frame condition quickly after seeing the match signal go away. The decision engine uses the standard in frame signal from the T1 deframer and the in frame signal from the special framing detector and decides what framing signals and what data to supply to the audio interfaces. It does this via control signals 421B.

Typically, the framer circuit generates frame-timing signals to the individual channels alerting them to the proper start of frame. When the system is out of frame these signals occur at the wrong time. In the present embodiment, however, the circuit of FIGS. 4 and 6 looks for the special framing signal and, if it sees two matching 01010011 patterns exactly 125 microseconds apart, produces an output that declares an "in frame" condition. It now intercepts the frame-timing signals from the framer and inserts its own, proper, frame-timing signals. These signals allow the channels to properly operate despite the framer circuit still being out of frame.

When a loss of incoming signal occurs, the special framing circuit does not see the predetermined frame pattern repeat twice and produces an output that declares a loss of frame. This will happen between 30 and 250 microseconds after a loss of signal. At that time, it intercepts the data from the framer to the channels and inserts a stream of logical ones. This eliminates any audio signal from being generated. Since the audio interface converts the bit stream to an analog signal by converting each 8 bits of time slot data into an analog quantity, a steady stream of ones would convert to a steady state DC level. Further, since DC is not in the audio band, no output would be generated. Since the noise can occur only from the time of loss of signal to the time the logical ones are inserted, it lasts much less than 1 millisecond. Audio teleprotection channels currently in use will not misinterpret 1 millisecond of noise to produce a false output state (that is, misoperate), so a vexing problem in the art is solved.

Figure 7:
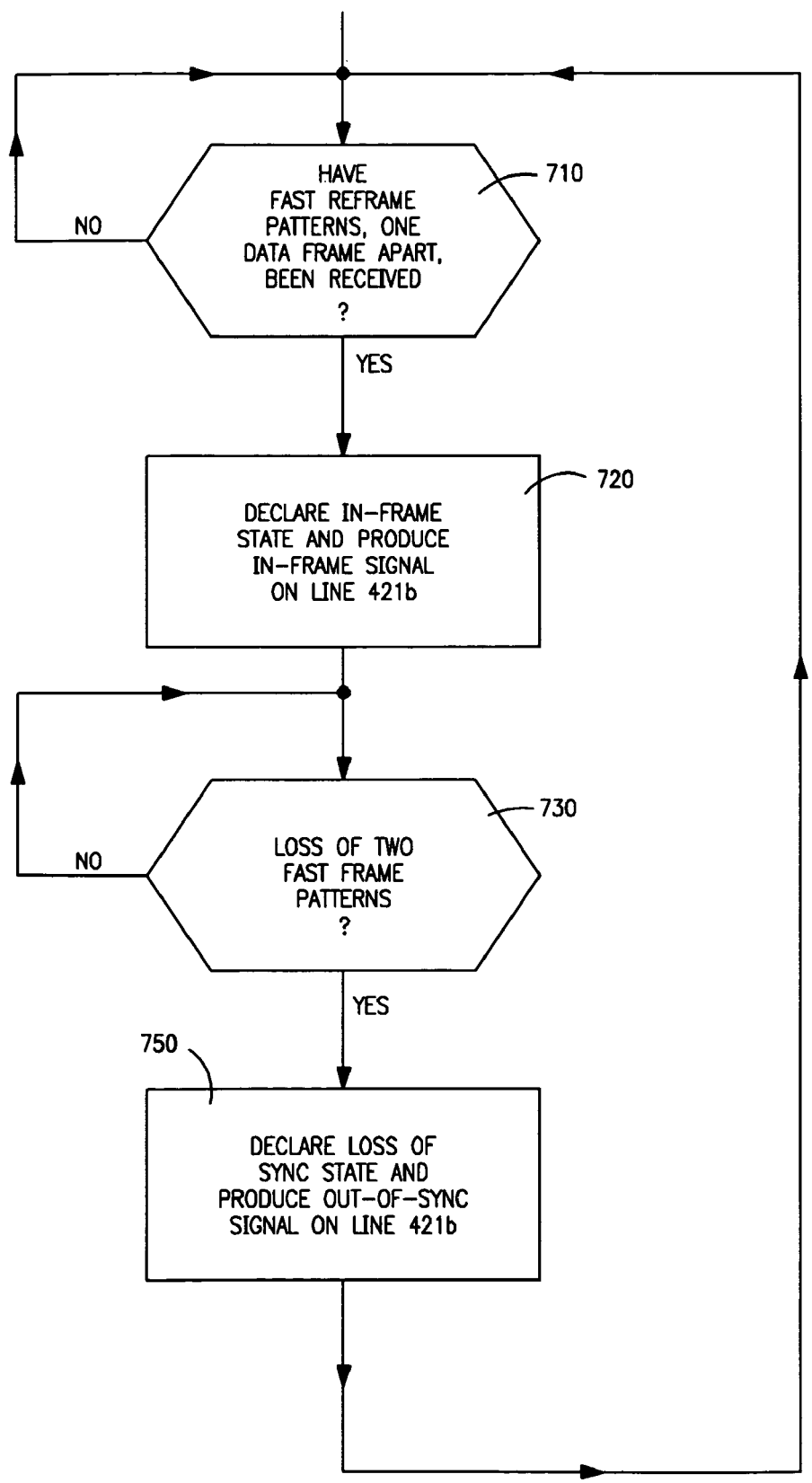
FIG. 7 is a flow diagram that represents an embodiment of the programmable logic for the decision engine of the FIG. 6 embodiment.

Referring to FIG. 7, there is shown a flow diagram that represents an embodiment of the programmable logic routine for the decision engine 650. The blocks 710 and 720 implement an initial capture phase of the routine (whereby, after initialization or after loss of sync, an in-frame state can be established), and the blocks 730 and 750 implement a normal operation phase of the routine (after an in-sync state is established, and operation is monitored for a possible loss of sync). The decision block 710 represents determination of whether two fast reframe patterns, one data frame apart, have been received. If not, the block 710 is re-entered, for continuation of this monitoring. If so, an in-frame state is declared (block 720) which results in production of an in-frame signal on line 421*b*. During the next phase of the routine, the block 730 represents monitoring for loss of the fast reframe pattern, and this continues (re-entry from the "no" output) until such time as a loss of pattern is detected. In the present embodiment, one loss of the fast reframe pattern is permitted. However, if two successive fast reframe patterns are not present (i.e., in FIG. 6, both comparator outputs indicating no match), the loss of sync state is declared (block 750), and the signal on line 421*b* is changed so that, in FIG. 4, the selector switches 415 and 423 will change the signals they select for coupling to audio interfaces, as previously described. As seen in FIG. 6, the decision engine 650 can also receive, for processing, the in-frame signal from the T1 deframer The invention has been described with reference to particular preferred embodiments, but variations within the spirit and scope of the invention will occur to those skilled in the art. For example, it will be understood that other means and techniques can be utilized for generating and sensing the fast reframe pattern, and for implementing the auxiliary timing signals and the override information signals.

The invention claimed is:

1. For use in conjunction with a system for producing, at a transmitter location, time division multiplexed frames comprising a plurality of channels of information signals and framing signals, communicating said frames from the transmitter location to a receiver location, and, at the receiver location, deframing the received frames to obtain frame timing signals and a bitstream of information signals which are coupled with a plurality of operating units, a method comprising the steps of:

at said transmitter location, inserting a preselected pattern of bits in a timeslot of said information signals;

at said receiver location, detecting, in the deframed bit stream, the absence of the preselected pattern of bits, and producing a control signal in response thereto; and producing override information signals that are coupled to said operating units when said control signal is present.

2. The method as defined by claim 1, further comprising the step of producing, at said receiver location, auxiliary frame timing signals for use when said control signal is absent.

3. The method as defined by claim 2, wherein said auxiliary frame timing signals are derived from the timing of the preselected pattern.

4. The method as defined by claim 1, wherein said step of inserting said preselected pattern of bits in a timeslot of said information signals comprises inserting said preselected pattern of bits in the last timeslot of said information channels.

5. The method as defined by claim 2, wherein said step of inserting said preselected pattern of bits in a timeslot of said information signals comprises inserting said preselected pattern of bits in the last timeslot of the said information channels.

6. The method as defined by claim 1, wherein said step of detecting, in the deframed bit stream, the absence of the preselected pattern of bits, and producing a control signal in response thereto, includes detecting the absence of two successive occurrences of the preselected pattern of bits, and producing said control signal in response thereto.

7. The method as defined by claim 2, wherein said step of detecting, in the deframed bit stream, the absence of the preselected pattern of bits, and producing a control signal in response thereto, includes detecting the absence of two successive occurrences of the preselected pattern of bits, and producing said control signal in response thereto.

8. The method as defined by claim 1, wherein said time division multiplexed frames are T1 frames.

9. The method as defined by claim 2, wherein said time division multiplexed frames are T1 frames.

10. The method as defined by claim 3, wherein said time division multiplexed frames are T1 frames.

11. For use in conjunction with a system for producing, at a transmitter location, time division multiplexed frames comprising a plurality of channels of information signals and framing signals, communicating said frames from the transmitter location to a receiver location, and, at the receiver location, deframing the received frames to obtain frame timing signals and a bitstream of information signals which are coupled with a plurality of operating units, an apparatus, comprising: at said transmitter location, means for inserting a preselected pattern of bits in a timeslot of said information signals;

at said receiver location, means for detecting, in the deframed bit stream, the absence of the preselected pattern of bits, and for producing a control signal in response thereto; and means for producing override information signals that are coupled to said operating units when said control signal is present.

12. Apparatus as defined by claim 11, further comprising means for producing, at said receiver location, auxiliary frame timing signals for use when said control signal is absent.

13. Apparatus as defined by claim 12, wherein said auxiliary frame timing signals are derived from the timing of the preselected pattern.

14. Apparatus as defined by claim 11, wherein said means for inserting said preselected pattern of bits in a timeslot of said information signals comprises means for inserting said preselected pattern of bits in the last timeslot of said information channels.

15. Apparatus as defined by claim 12, wherein said means for inserting said preselected pattern of bits in a timeslot of said information signals comprises means for inserting said preselected pattern of bits in the last timeslot of said information channels.

16. Apparatus as defined by claim 11, wherein said means for detecting, in the deframed bit stream, the absence of the preselected pattern of bits, and for producing a control signal in response thereto, includes means for detecting the absence of two successive occurrences of the preselected pattern of bits, and for producing said control signal in response thereto.

17. Apparatus as defined by claim 12, wherein said means for detecting, in the deframed bit stream, the absence of the preselected pattern of bits, and for producing a control signal in response thereto, includes means for detecting the absence of two successive occurrences of the preselected pattern of bits, and for producing said control signal in response thereto.

18. Apparatus as defined by claim 11, wherein said time division multiplexed frames are T1 frames.

19. Apparatus as defined by claim 12, wherein said time division multiplexed frames are T1 frames.

20. Apparatus as defined by claim 13, wherein said time division multiplexed frames are T1 frames.

* * * * *